United States Patent [19]

Michon et al.

[11] Patent Number: 5,436,442
[45] Date of Patent: Jul. 25, 1995

[54] HIGH TEMPERATURE PHOTODETECTOR ARRAY

[75] Inventors: Gerald J. Michon, Waterford; Harold W. Tomlinson, Jr., Scotia; Jerome J. Tiemann, Schenectady, all of N.Y.

[73] Assignee: General Electric Company, Schenectady, N.Y.

[21] Appl. No.: 124,527

[22] Filed: Sep. 22, 1993

Related U.S. Application Data

[63] Continuation-in-part of Ser. No. 979,022, Nov. 20, 1992, Pat. No. 5,357,337.

[51] Int. Cl.⁶ ............................................. H01J 40/14
[52] U.S. Cl. ......................... 250/208.1; 250/214 RC
[58] Field of Search ............. 250/208.1, 208.2, 214 C, 250/214 RC; 358/212, 213.27–213.31, 213.16

[56] References Cited

U.S. PATENT DOCUMENTS

| | | | |
|---|---|---|---|
| 4,511,804 | 4/1985 | Ozawa | 250/208.1 |
| 4,807,038 | 2/1989 | Michon | 358/213.31 |
| 5,357,337 | 10/1994 | Michon et al. | 356/346 |
| 5,373,295 | 12/1994 | Michon | 341/159 |

*Primary Examiner*—Stephone B. Allen
*Attorney, Agent, or Firm*—Ann M. Kratz; Marvin Snyder

[57] ABSTRACT

An optical detection system includes an array of photodetectors, each of which is positioned for receiving light and converting the light into an electrical signal. A plurality of high pass filters is positioned with each one of the high pass filters electrically coupled to a respective photodetector for passing a portion of a respective electrical signal having frequency components at least as high as the high pass filter cutoff frequency. In one embodiment, each one of the filters comprises a capacitance coupled to the photodetector and a depletion mode FET with shorted gate-to-source terminals coupled between the photodetector and a bias voltage source. Each of the FETs comprises a silicon substrate, a silicon dioxide first insulative layer having a trench and a first conductive layer covering a portion of the first insulative layer including a portion of the trench, and each of the capacitances comprises the first conductive layer, a second insulative layer covering a portion of the first conductive layer, and a second conductive layer covering a portion of the second insulative layer.

19 Claims, 3 Drawing Sheets

HIGH TEMPERATURE PHOTODETECTOR ARRAY

CROSS REFERENCE TO RELATED APPLICATION

This application is a continuation-in-part of Michon et al., "High Speed Interferometer Fourier Transform Spectrometer," application Ser. No. 07/1979,022, filed Nov. 20, 1992, now U.S. Pat. No. 5,357,337.

BACKGROUND OF THE INVENTION

1. Field of the Invention

This invention is generally directed to photodetector arrays, and, more particularly to a compact system for blocking dark current and passing signal current by capacitive coupling.

2. Description of the Related Art

One type of electro-optic system using light as a signal carrier includes sensors of various parameters such as position, temperature, and pressure; fiber optic interconnects; and effectors such as actuators and relays. The advantages of an electro-optic system over an electrical system include reduced weight, reduced EMI (electro-magnetic interference) sensitivity, and reduced costs.

Multichannel spectrographs are one way of providing an optical-to-electronic conversion of the signals generated from optical sensors, especially those sensors that are used in wavelength division multiplexing networks or rely on wavelength encoding of the sensed parameter. Previous multi-channel spectrographs have used off-the-shelf charge coupled device (CCD) arrays to convert the light spectrum to an electronic signal. Most existing CCD structures are a poor match to the dispersed optical image from a spectrograph. Typically, the dispersed image has a height of about 130 μm, whereas the CCD row height is about 13 μm. Ninety percent of the available illumination is thus lost unless the signals from a number of imager rows are read out, converted to digital form, stored, and combined. This is an unwieldy, expensive approach.

In some applications, various components in electro-optical systems must operate at temperatures as high as 125° C. Conventional silicon sensors such as photodiodes, charge injection devices, and charge coupled devices exhibit large dark currents at high temperatures. Although a custom CCD with the proper pixel height could be developed to reduce illumination loss, that CCD would not address the dark current problem. In some cases these dark currents saturate the photodetector and thus render the photodetector useless. In other cases, photodetectors that can handle the dark currents exhibit a spatial variation of dark current among the various photodetectors of an array which generates a high level of background signal level as compared with the desired signal level.

Available sensor arrays measure the total photodetector current, i.e., the sum of the dark current and signal current. Charge storage capacity is limited by the structure used and forces operation at short integration times with a resultant high frequency analog-to-digital conversion and ancillary electronics operation. Dark current varies from element-to-element, so that the background level is a pattern noise that is exponentially temperature dependent, and operation of sensor arrays is typically limited to a maximum temperature of 85° C.

SUMMARY OF THE INVENTION

Accordingly, an object of the invention is to reduce the effects of dark currents on an optical detection array.

Another object of the invention is to provide a compact high pass filter having high resistance and capacitance values.

Briefly, in accordance with a preferred embodiment of the invention, a detection system comprises an array of photodetectors, each of which is positioned for receiving light and converting the light into an electrical signal. A plurality of high pass filters is positioned such that each one of the high pass filters is electrically coupled to a respective photodetector for passing a portion of a respective electrical signal having frequency components at least as high as the high pass filter cutoff frequency. Each one of the filters comprises a capacitance coupled to a respective photodetector and a depletion mode FET coupled between the respective photodetector and a bias voltage source. In one embodiment, each of the FETs comprises a silicon substrate supporting a silicon dioxide first insulative layer having a trench, and a first conductive layer covering a portion of the first insulative layer which includes a portion of the trench, with each of the capacitances comprising the first conductive layer, a second insulative layer covering a portion of the first conductive layer, and a second conductive layer covering a portion of the second insulative layer.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

Figures 1, 2:
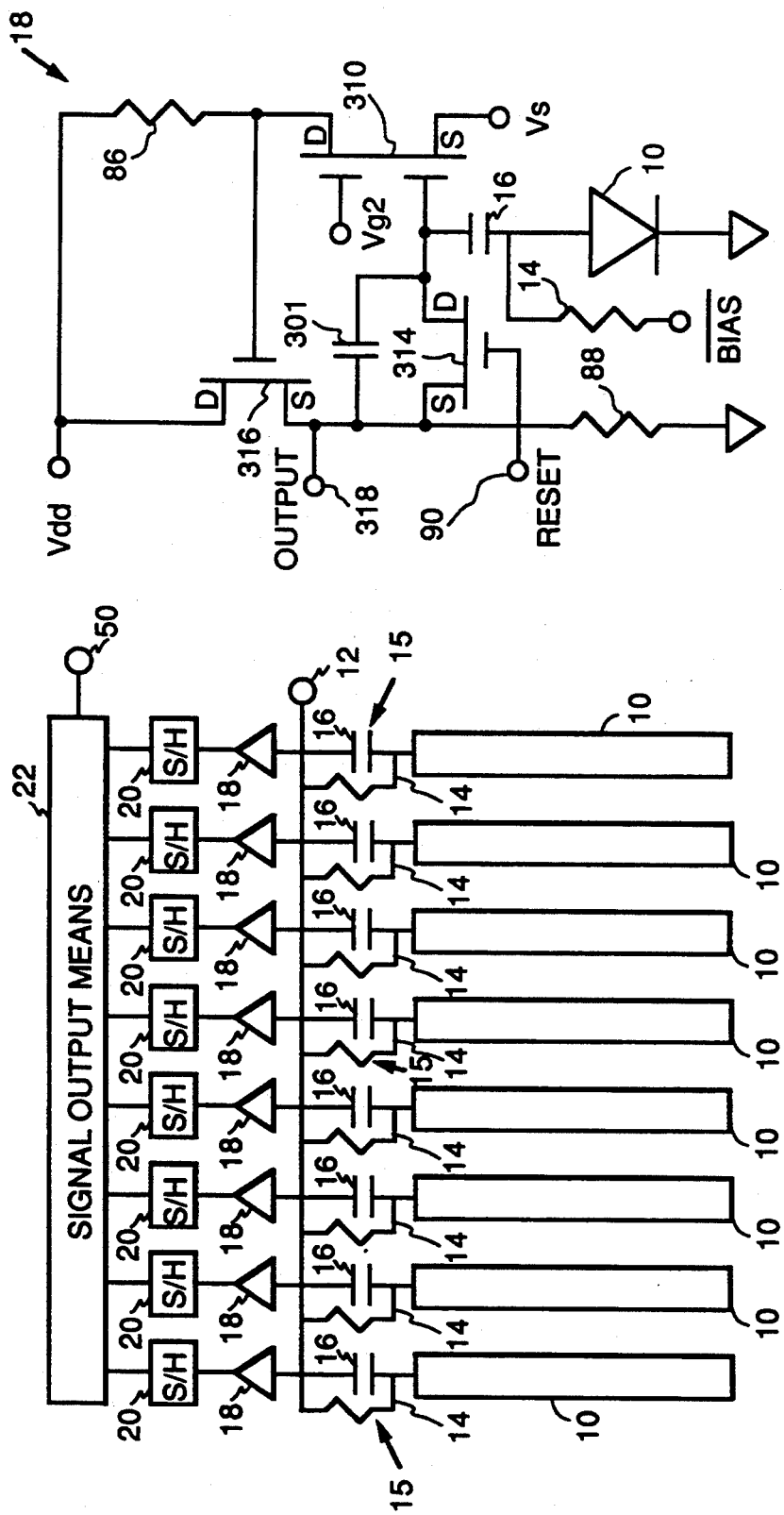
FIG. 1 is a schematic diagram of a preferred embodiment of the invention.
FIG. 2 is a circuit diagram showing a preferred type of integrating amplifier in the invention.

In FIG. 1, a linear array of photodetectors 10 is shown coupled to a plurality of high pass filters 15. In this embodiment, the photodetectors are resistively coupled to a bias voltage source 12 by resistances 14 and capacitively coupled to integrated amplifiers 18 by capacitances 16. Dark current is not sensed, and signal charge is stored on the capacitance (not shown) of the integrating amplifier. Preferably a pulsed laser or light emitting diode (LED) or a chopped continuous wave laser or lamp is used as a light source (not shown) so that the signal charge is separated temporally from a major fraction of the dark current charge. Amplifiers 18 are coupled to sample and hold circuits 20 which, in turn, are coupled to signal output means 22, for sending the signals to an output node 50. The signal output means can comprise a plurality of direct output pins, or a multiplexer, or a signal shift register, for example.

The photodetector array, which can be either a linear or an area array, generates a plurality of output signals in accordance with the pattern of energy impinging on the array. Photodetectors 10 can be diode photodetectors or any other type of energy detectors. In the preferred embodiment, photodetectors 10 comprise photodiodes.

Each photodetector 10 is coupled with a respective resistance 14 having a value $R_B$ to bias voltage source 12 whose voltage equals $V_B$. Any direct current, $I_{DC}$, flowing in the reverse biased photodiode, whether dark current or photocurrent, is supplied by the resistance. Resistance values preferably are high (in the megohm range) for noise minimization, and are chosen in accordance with the expected dark current and supply voltage such that $R_2 < V_B/I_{DC}$.

Each photodetector 10 is additionally coupled to a respective capacitance 16. The resistance and capacitance connected to each respective photodetector form a respective high pass filter 15. The value of the capacitance depends on the desired application. The resistance and capacitance values are chosen to achieve a time constant compatible with the pulse width of the light source. Signal currents with frequency components at least as high as the filter cutoff frequency are further processed. In this manner, photocurrents that are the result of a pulsed light source can be separated from the dark current. Variations in dark current among the photodetectors are not sensed.

Preferably each capacitance 16 is coupled to a respective integrating feedback amplifier 18, preferably a low noise, wide dynamic range amplifier. The input impedance of each integrating amplifier 18 is typically lower than that of the respective resistance 14 so that a greater portion of the signal current is coupled to the amplifier. Integrating amplifiers 18 are not necessarily required by the invention, however, so capacitances 16 could be coupled directly to either sample and hold circuits 20 or to signal output means 22.

Sample and hold circuits 20 are preferably coupled between capacitances 16 (or, if present, integrating amplifiers 18) and signal output means 22. When a signal shift register is used as the signal output means, the sample and hold circuits allow the detected signals to be transferred to output node 50 while the next line of data is detected (or amplified). In one embodiment, the sample and hold circuits have a sampling period which is substantially longer than the duration of the light pulses sensed by photodetectors 10.

In one embodiment, a signal shift register is used as the signal output means, and the photodetector size is designed to match the dispersed image size using four arrays of 128 photodetectors, each 140 μm high, on 25 μm centers. The use of pulsed LED light sources allows fibers to be multiplexed by simply combining fiber output ends and pulsing the appropriate source to send a light pulse to a predetermined fiber input end at a predetermined time. In this example, the resistance can be 5 megohms and the capacitance can be 2 picofarads, providing a time constant of 10 microseconds. An LED pulse width of 32 microseconds results in 96% of the signal charge being transferred to the integrating amplifier. A typical high temperature (about 125° C.) dark current requires that the bias voltage only be greater than 25 millivolts (5 megohms times 5 nanoamperes). Because the signals are sampled and held within the photodetector array at the signal shift registers, the result of one pulse can be transferred to the array output while the next pulse is being integrated. The signals will be capable of transfer at a rate of 4 MHz. This results in a maximum optical fiber multiplex rate of about 30 KHz for each array.

FIG. 2 depicts an exemplary circuit diagram for a self-biasing integrating amplifier 18 which is similar to that discussed in aforementioned Michon et al., U.S. Pat. No. 5,357,337. A low power, low noise P-channel cascode amplifier has been previously designed and fabricated for use in a parallel readout image sensor, as described in G. J. Michon, U.S. Pat. No. 4,807,038, issued Feb. 21, 1989. A charge sensitive amplifier has been previously disclosed in G. J. Michon, "Digital Interface Circuit for High Dynamic Range Analog Sensors", U.S. Pat. No. 5,373,295, filed Sep. 2, 1992.

In the self-biasing integrating amplifier shown in FIG. 2, the signal detected by photodetector 10 is coupled through capacitance 16 to one side of a capacitance 301 and to one of the gates of a dual gate enhancement mode FET 310. The second gate of FET 310 is connected to a d.c. bias voltage Vg2. The source electrode of FET 310 is connected to a bias voltage source Vs, which is a threshold voltage of lower amplitude than the photodetector array bias voltage, and the drain electrode is connected to a voltage source Vdd through a first resistor 86.

The drain electrode of FET 310 is additionally connected to the gate of FET 316. The drain electrode of FET 316 is connected to the source of voltage Vdd. The source electrode of FET 316 is connected to one side of a second resistor 88 and one side of capacitance 301. A FET 314 has its source electrode connected to the common connection of the source electrode of FET 316, capacitance 301, and resistor 88 and has its drain electrode connected to the common connection capacitance 16, capacitance 301, and the first gate of FET 310. The gate of FET 314 is connected to a reset terminal 90.

In operation, after being filtered by resistance 14 and capacitance 16, the signal current is amplified by the combination of FET 310 and first resistor 86. FET 316 drives the load, and feedback capacitance 301 is used for integrating the signal current. Reset FET 314 acts as a stabilizer for the circuit.

For applications requiring low power, small size, high value resistors, depletion mode FETs can be employed. Thus resistors 86 and 88 can be comprised of depletion mode FETs. If use of the amplifier should result in insufficient stability, then an additional resistor (not shown) in series with FET 314 would be useful for stabilization.

Figure 3:
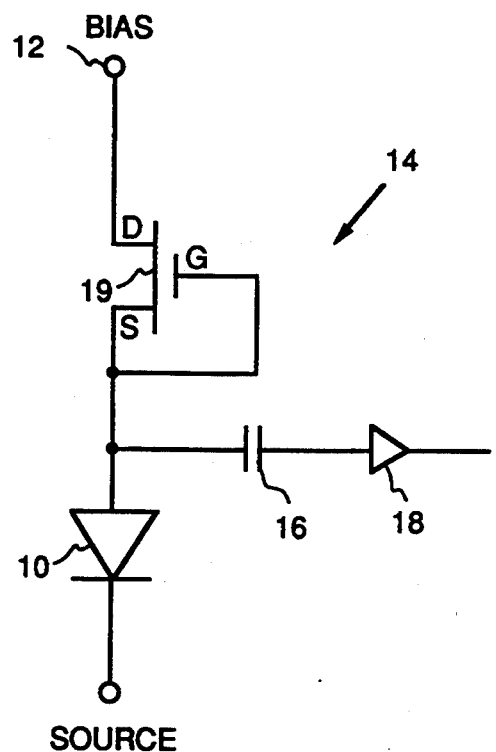
FIG. 3 is a circuit diagram showing a preferred type of resistance in the invention.

FIG. 3 is a circuit diagram illustrating use of a preferred type of resistance 14. The resistance 14 in this embodiment is a depletion mode field effect transistor (FET) 19 having a drain coupled to the bias voltage and a gate and source shorted to each other and coupled to photodetector 10 and capacitance 16. The benefit of this embodiment is reduced power consumption, small size, and high resistance values.

Figure 4:
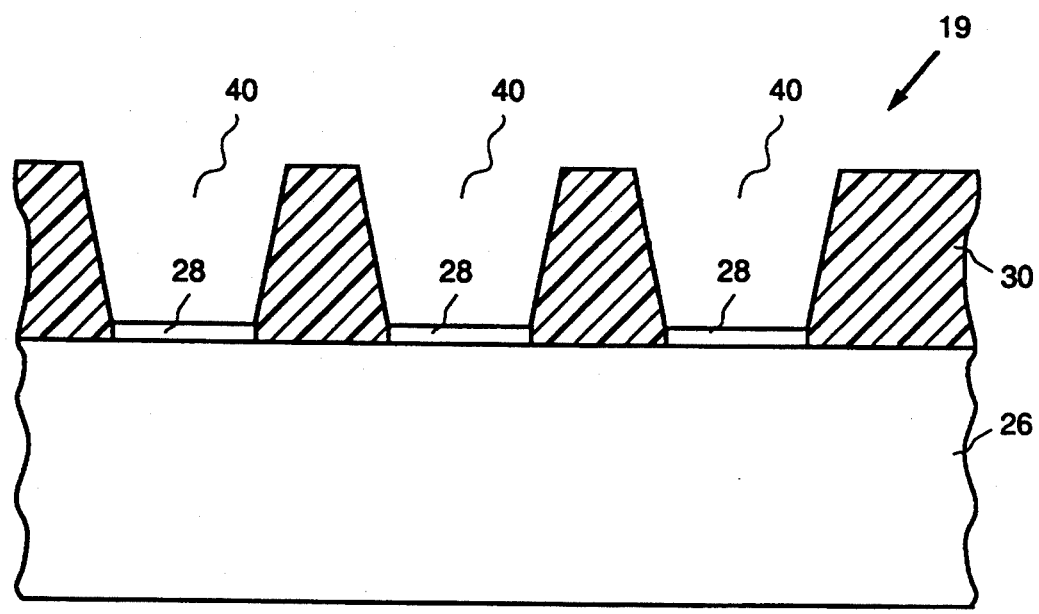
FIG. 4 is a sectional side view of a structure employed in one technique for forming a silicon field effect transistor channel.
Figure 5:
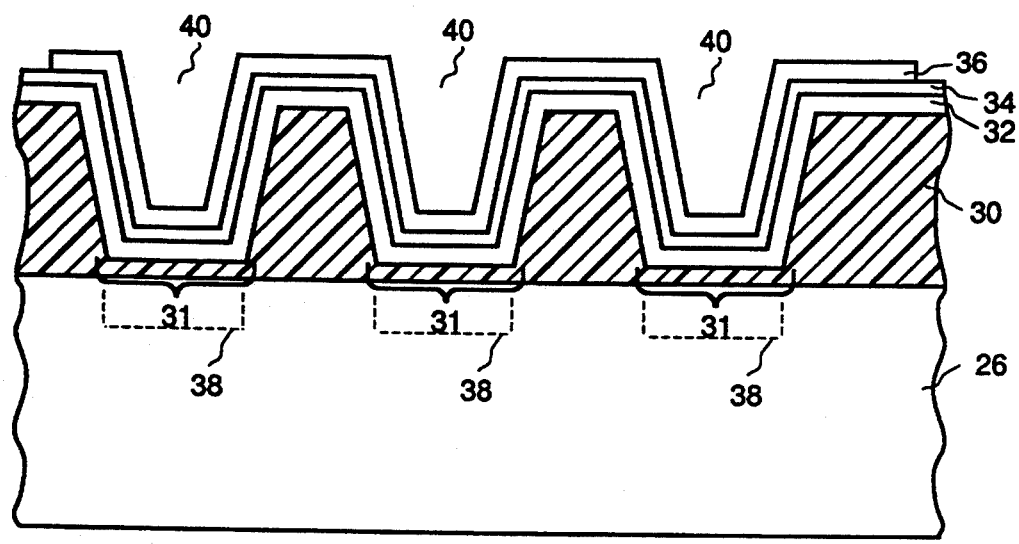
FIG. 5 is a view similar to that of FIG. 4, further showing the application of conductive layers to the structure.
Figure 6:
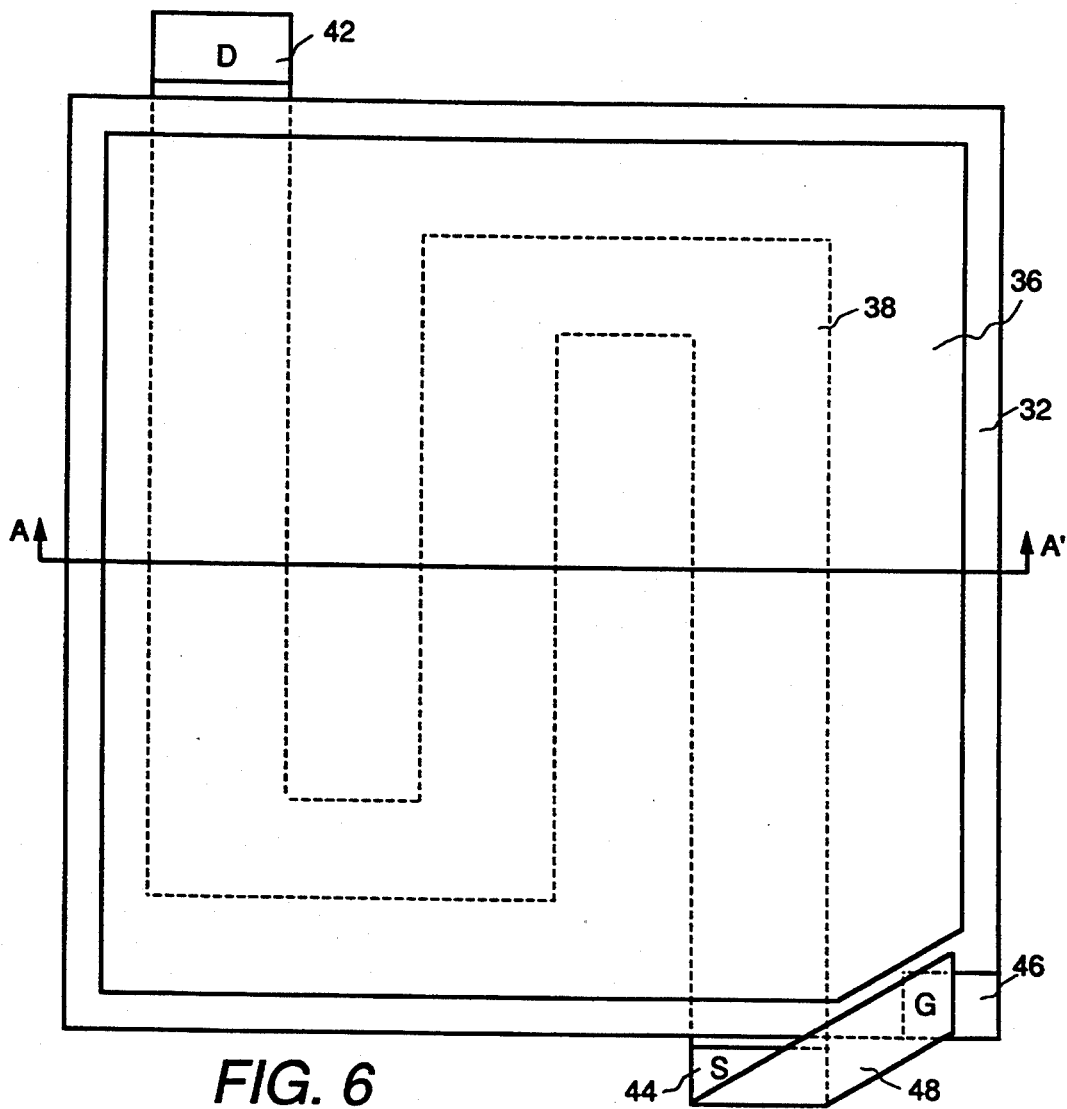
FIG. 6 is a top schematic view of of the field effect transistor channel and conductive layers of FIG. 5.

FIGS. 4-6 illustrate processing techniques designed to achieve a higher resistance from a depletion mode FET 19, as used in the circuit of FIG. 3. This method fabricates the resistance and capacitance at the same time in a compact area. As shown in FIG. 4, a substrate 26, which in one embodiment comprises silicon, supports a first insulative layer 30, comprising silicon dioxide for example, having a trench 40. A silicon dioxide first insulative layer with a trench can be formed by any one of a number of methods including selective growth and selective etching.

For example, in an embodiment in which first insulative layer 30 is selectively grown, an oxygen barrier pattern 28, comprising silicon nitride for example, is first applied to reduce the growth of first insulative layer 30 in desired areas and create trench 40. One process of applying a layer of silicon nitride is deposition, followed by a selective etch. Barrier pattern 28, which affects the resistance, is designed to fit the constraints of the desired application. One exemplary pattern of a channel resistance path 38 formed by this process is shown in FIG. 6. First insulative layer 30 can be grown by any conventional method. In one embodiment, first insulative layer 30 is grown to a thickness of about 1 micron. The barrier pattern is removed by a selective etch.

As shown in FIG. 5, an insulative addition, shown as portion 31 of first insulative layer 30, comprising silicon dioxide, for example, is then grown atop the entire structure. In one embodiment, the insulative addition has a thickness of about 600 Å on portion 31 which is adjacent the substrate and a much reduced thickness on the already present first insulative layer. As the insulative addition is grown, it becomes part of first insulative layer 30. Conductive layers are then applied to complete the field effect transistor and form the capacitance. A first conductive layer 32, which can comprise any electrically conductive material, is applied over first insulative layer 30. In a preferred embodiment first conductive layer 32 comprises a polycrystalline silicon (hereinafter "polysilicon"), preferably of n+ type conductivity, having a thickness of approximately 4750 Å. This layer forms the gate of the resistance FET and one conductivity surface for capacitance 16 (shown in FIGS. 1 and 3).

One advantage of using polysilicon for conductive layer 32 is that a second insulative layer 34, which is applied over first conductive layer 32, is then easily fabricated. In one embodiment, the second insulative layer comprises silicon dioxide and has a thickness of about 800 Å which is grown over a polysilicon first conducting layer 32. Next a second conductive layer 36 is applied over second insulative layer 34. In one embodiment, second conductive layer 36 comprises n+ type conductivity polysilicon material having a thickness of approximately 4500 Å. First and second conductive layers 32 and 36 can be formed by conventional methods including, for example, decomposing a gas including a silicon compound to form the layers.

Capacitance 16 (shown in FIGS. 1 and 3) appears between the first and second conductive layers. The resistance is present in path 38 under trench 40.

FIG. 6 is a top schematic view of resistance path 38 and first and second conductive layers 32 and 36. A drain contact area 42 and a source contact area 44 are, in one embodiment, situated at the ends of trench 40 (shown in FIG. 5). The drain and source contact areas can be made conductive by applying a mask and metallizing the desired areas in the trench. As shown, first and second conductive layers 32 and 36 overlie portions of resistance path 38. Preferably the layers do not overlie drain contact area 42 or source contact area 44.

Additionally, it is useful to provide open space and metallize a gate contact area 46 somewhere on first conductive layer 32 so that source contact area 44 and gate contact area 46 can be shorted to each other with an electrical source-gate conductor means 48.

To complete the circuit, second conductive layer 36 is coupled to integrating amplifier 18, source-gate conductor means 48 is coupled to photodetector 10, and drain contact area 42 is coupled to bias voltage source 12 (integrating amplifier 18, photodetector 10, and bias voltage source 12 are shown in FIG. 1).

While only certain preferred features of the invention have been illustrated and described herein, many modifications and changes will occur to those skilled in the art. For example, other types of high pass filters, such as inductance filters, can be used. It is, therefore, to be understood that the appended claims are intended to cover all such modifications and changes as fall within the true spirit of the invention.

What is claimed is:

1. An optical detection system comprising:
   an array of photodetectors, each of said photodetectors being adapted to receive light and convert the received light into an electrical signal;
   a plurality of high pass filters, each one of said high pass filters electrically coupled to a respective photodetector for passing a portion of a respective electrical signal having frequency components at least as high as the high pass filter cutoff frequency; and
   a signal output means, each one of said high pass filters being coupled to said signal output means.

2. The detection system of claim 1, wherein said signal output means comprises output means selected from the group consisting of a multiplexer, a signal shift register, and a plurality of direct output pins.

3. The detection system of claim 2, further including a plurality of integrating amplifiers, each of said amplifiers coupling a respective one of said high pass filters to said signal output means for amplifying a respective passed signal.

4. The detection system of claim 3, further including a plurality of sampling and holding means, each one of said sampling and holding means coupling a respective one of said plurality of amplifiers to said signal output means.

5. The detection system of claim 4, further including a source of pulsed excitation light for supplying to said array of photodetectors light pulses with a time duration substantially shorter than the sampling period of said sampling and holding means.

6. The detection system of claim 5, wherein said source of pulsed excitation light comprises a light source selected from the group consisting of a light emitting diode, a laser, and a lamp.

7. The detection system of claim 2, wherein each one of said filters comprises a capacitance coupled to said photodetector and a resistance coupled between said photodetector and a bias voltage source.

8. The detection system of claim 7, wherein said resistance comprises a depletion mode field effect transistor (FET).

9. The detection system of claim 8, wherein said FET comprises a semiconductor substrate, a first insulative layer atop said substrate having a trench therein, and a first conductive layer covering a portion of said first insulative layer including a portion of said trench; and wherein said capacitance comprises said first conductive layer, a second insulative layer covering a portion of said first conductive layer, and a second conductive layer covering a portion of said second insulative layer.

10. The detection system of claim 9, wherein said substrate comprises silicon, said first and second conductive layers are comprised of a polysilicon material, and said first and second insulative layers comprise silicon dioxide.

11. An optical detection system comprising:
an array of photodetectors, each of said photodetectors being adapted to receive light and convert the received light into an electrical signal; and
a plurality of high pass filters, each one of said high pass filters electrically coupled to a respective photodetector for passing a portion of a respective electrical signal having frequency components at least as high as the high pass filter cutoff frequency, each one of said filters comprising a capacitance coupled to said photodetector and a depletion mode FET coupled between said photodetector and a bias voltage source.

12. The detection system of claim 11, wherein said FET comprises a semiconductor substrate, a first insulative layer atop said substrate having a trench therein, and a first conductive layer covering a portion of said first insulative layer including a portion of said trench; and
wherein said capacitance comprises said first conductive layer, a second insulative layer covering a portion of said first conductive layer, and a second conductive layer covering a portion of said second insulative layer.

13. The detection system of claim 12, wherein said substrate comprises silicon, said first and second conductive layers are comprised of a polysilicon material, and said first and second insulative layers comprise silicon dioxide.

14. The detection system of claim 13, further including a signal output means, each one of said capacitances being coupled to said signal output means.

15. The detection system of claim 14, wherein said signal output means comprises output means selected from the group consisting of a multiplexer, a signal shift register, and a plurality of direct output pins.

16. The detection system of claim 15, further including a plurality of sampling and holding means, each one of said sampling and holding means coupling a respective one of said plurality of capacitances to said signal output means.

17. The detection system of claim 16, further including a source of pulsed excitation light for supplying to said array of photodetectors light pulses with a time duration substantially shorter than the sampling period of said sampling and holding means.

18. The detection system of claim 17, further including a plurality of integrating amplifiers, each of said amplifiers coupling a respective one of said capacitances to a respective one of said sampling and holding means.

19. An optical detection method, comprising the steps of:
detecting and converting a plurality of optical signals into a plurality of respective electrical signals;
blocking first portions of said electrical signals having frequency components lower than a cutoff frequency while passing the remaining portions of said electrical signals;
integrating the remaining portions of said electrical signals;
sampling and holding the integrated portions of the electrical signals; and
shifting the sampled and held signals to an output terminal.

* * * * *